(No Model.)
R. F. SILLIMAN.
UNDERGROUND ELECTRICAL CONDUIT.
No. 378,021. Patented Feb. 14, 1888.
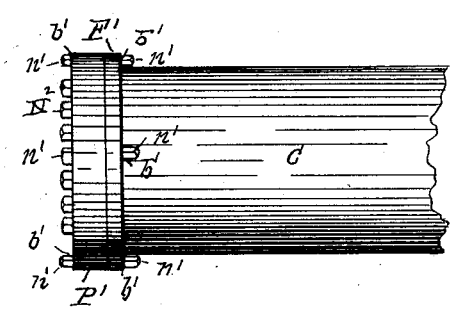
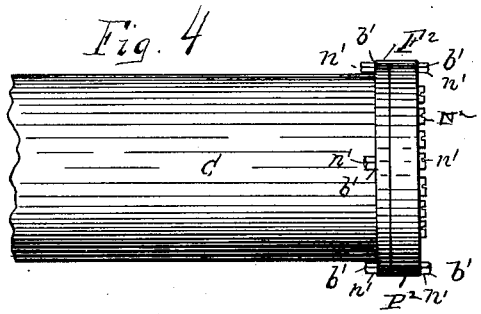
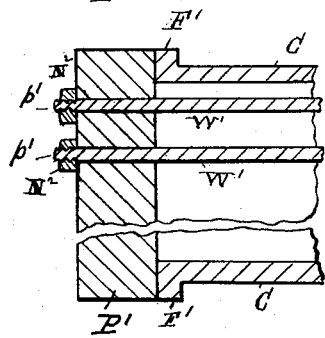
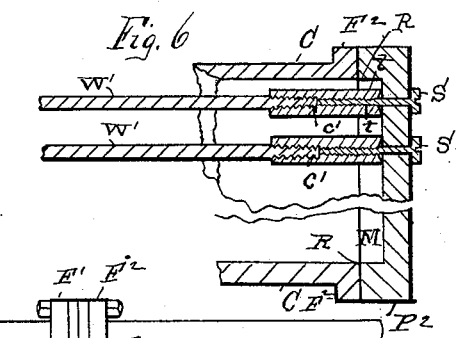
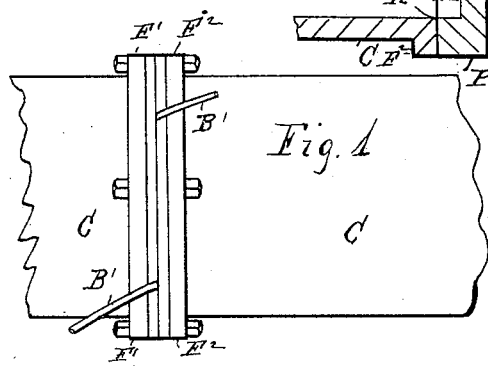
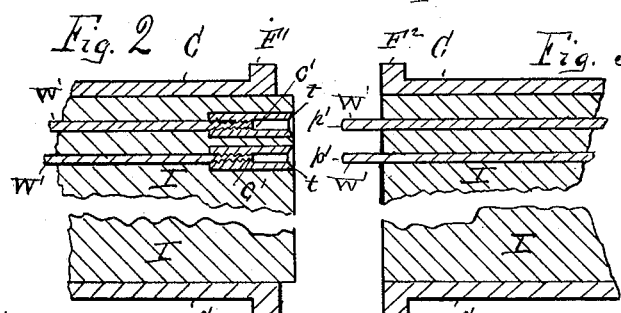
WITNESSES
Geo. A. Darby.
Charles S. Paintuall
INVENTOR
Robert F. Silliman
by W. E. Hagan his atty

UNITED STATES PATENT OFFICE.

ROBERT F. SILLIMAN, OF TROY, NEW YORK.

UNDERGROUND ELECTRICAL CONDUIT.

SPECIFICATION forming part of Letters Patent No. 378,021, dated February 14, 1888.

Application filed May 23, 1887. Serial No. 239,036. (No model.)

*To all whom it may concern:*

Be it known that I, ROBERT F. SILLIMAN, of the city of Troy, county of Rensselaer, and State of New York, have invented a new and useful Improvement in Underground Electrical Cables, and of which the following is a specification.

My invention relates to underground electrical conduits, and more particularly to a method of connecting the conduit-sections, it being the object and purpose of my invention to facilitate the attachment of the wires of each of the sections of a conduit and to secure a good connection and insulation thereat.

Accompanying this specification, to form a part of it, there is a plate of drawings containing six figures illustrating my invention, with the same designation of parts by letter-reference used in all of them.

Of the illustrations, Figure 1 shows ends of two conduit-sections connected by means of my invention, illustrating also the manner of running lateral wires therefrom. Figs. 2 and 3 show in horizontal section two separated ends of the parts of a conduit, illustrated as connected at Fig. 1, with the rubber washer-ring or gasket omitted. Fig. 4 shows in side elevation, and illustrated as centrally broken apart between the ends, a length of conduit containing my invention with templet-plates at the ends for holding the wires in place during their insulation and for preparing the ends of the parts for union. Figs. 5 and 6 show longitudinal sections of the ends of the conduit part and templet-plates therein, indicated at Fig. 4, showing also two of the wires.

The several parts of the apparatus thus illustrated are designated by letter-reference, and the function of the parts is described as follows:

The letters C C designate the pipes or tubular-form inclosures in which the wires are placed, and F' F² their end flanges for connection by means of bolts $b'$ and nuts $n'$.

The letters W' designate the wires, $p'$ their projecting ends, and $c'$ their coupler ends, the projecting ends of the wires being arranged at one end of the conduit-length and the coupler ends at the other end. The coupler ends $c'$ of the wires W' consist of a tube, $t$, which is at its inner end threaded onto each one of the wires, each of which coupler ends formed by the tube $t$ is adapted to receive one of the projecting wire ends $p'$ of another conduit part or section to make a circuit-connection thereat. The wires are arranged to be uniformly placed within each of the conduit parts by means of templet-plates P' and P², which face on the flanges F' F² of each end, so as to be secured thereon temporarily (by the bolts and nuts which connect the sections) during the operation of insulating the wires within the conduit.

The templet-plate P² is pierced for the wires, and is made with a rim or projecting flange, R, on its inner edge, forming a recess, M, therein, so that the filling or insulating material will enter therein to extend beyond that end of the pipe or case C whereon the templet-plate P² is used. The other templet-plate, P', is also pierced for the wires so that the holes made therein will register with those in the templet-plate P²; but this plate is not recessed, and stops off the insulating-filling on a line parallel to that end of the pipe C whereon applied.

The wires are made taut within the case C upon that end of the latter containing the templet-plate P', during the filling of the latter, by means of nuts N², temporarily placed on the projecting ends of the wires thereat, as indicated at Fig. 5, and at the end of the pipe C whereon the templet-plate P² is placed by means of screws S, temporarily inserted in the said templet-plate and screwed into the coupler tubes $t$ of the wires W'. As either the screws S or the nuts N² are turned, the requisite tension is obtained upon the wires to keep them taut and in place during the operation of filling the pipe C with the insulating compound. When the wires have thus been placed, and the insulating compound has become fixed and stable within the pipe C, the screws S are removed from the templet-plate P' and the nuts N² from the templet-plate P², and the projecting ends $p'$ of the wires are cut off where extending beyond the said templet-plate P². The templet-plates are then both removed. The insulating compound I, where molded by the recess M of the templet-plate P', will project beyond the end of the pipe C, as indicated at Fig. 2, with the coupler ends $c'$ of the wires then flush with the filling, and the wire ends of the other end section will project beyond the filling, as indicated at Fig. 3.

When the ends of each section of the conduit are brought together, the projecting wires p' will each enter one of the couplings c' of the coupler ends of the wires of the adjacent end of the conduit, and the insulating compound of both parts of the conduit will be brought in contact, with an intervening space between the adjacent ends of the case or pipes C, adapted to receive a gasket of rubber or other suitable material. By thus extending the insulation beyond the pipe or cable-case sections at one of their ends, and finishing up the insulation flush with their other end, when these two ends are brought together so as to bring the insulating material in contact, there is a space left between the pipe or cable-case parts, whereat the insulation may be cut out to run out one or more of the wires to a local use, as indicated at B' B', Fig. 1, the wires passing between the gaskets or washers interposed between the abutting ends of the sections. By thus arranging the pipes or cable-case parts with intermediate gaskets or washers room is given for their expansion and contraction.

The threads formed in the tubes t of the couplers to secure the screws S during the filling of the conduit-sections are drilled out to a proper size before the projecting ends p' are inserted therein, as shown at Fig. 2.

To fill the inclosures or pipes C, any well-known insulating compound may be passed in through a central opening made in either of the templet-plates with the pipe stood upon its end; and as my invention herein relates merely to the manner of connecting the wires and arranging the position of the insulating compound as to the ends of each of the sections, the compound used for insulating need not be described any further than that it should by its consistency when applied to the pipes be adapted to be shaped at the ends, as herein described.

While I have shown but two wires arranged in the conduit parts which I illustrate, a larger number may be used if arranged in the same manner.

Having thus described my invention, what I claim, and desire to secure by Letters Patent, is—

1. In an underground electrical conduit, the combination of an inclosing-pipe or cable-case made in sections adapted to connect at the ends by flanges and bolts and joints, an insulating material filling the section, made to project at one end of each of the pipe or case sections beyond the latter, and at each of the other ends of each of the sections made flush with the latter, and a washer arranged around the end-projecting insulating material and between the end-connecting flanges of the cable-case or pipe sections, substantially as and for the purposes set forth.

2. In an underground electrical conduit, an inclosing-pipe or cable-case made in sections and adapted to connect at the ends, substantially as described, wires arranged within the pipe or cable-case sections, embedded in insulating material, which wires at one of the ends of each section, together with the insulating material, subtend coincidently the end of the pipe or case sections, and which wires at their opposite ends project beyond the ends of the pipe or case sections, with the insulation ending flush with the end of the pipe or case sections, substantially as and for the purposes set forth.

3. In an underground electrical conduit, the combination of a pipe or exterior case made in sections that are adapted to connect at each end substantially as described, an insulating material arranged in each of the case-sections, filling the spaces between the wires thereof, said insulating material being at one end of each of said pipe or case sections made to subtend the latter and at the other end made flush therewith, wires arranged within the case, and insulating material with the connecting ends of the wires at one end of each of the pipe or case sections made flush with the subtending end of the insulating material and at their opposite ends made to project beyond the insulation where the latter is flush with the pipe or case sections, substantially as and for the purposes set forth.

4. In an underground electrical conduit, the combination of a pipe or case made in sections that are adapted to be connected at the ends, and insulating material arranged in each pipe or case section, filling the spaces between the wires thereof, which insulating material at one end of each pipe or case section subtends the latter and at each of the other ends is flush with the pipe or case end, wires arranged within the insulating material so as to have their coupler ends at one end of the pipe or case sections flush with the subtending end of the insulating material thereat and at their other ends to project beyond the insulating material where flush with the pipe or case sections, and a gasket or washer arranged around the projecting end of the insulating material and between the end flanges of each section, said gasket being adapted for the passage of a branching wire or wires thereat, substantially as shown and described.

5. An underground conduit for electric wires, consisting of a series of pipe or cable-case sections, C, adapted to connect substantially as described, an insulating material in each section arranged at one end to project beyond the pipe or cable-case section and at the other end to be flush therewith, wires arranged in each section of pipe or cable-case, said wires having tube-form coupler ends within the subtending end of the insulating material that are flush therewith and at their opposite ends made to project beyond the insulating material and pipe or case end, substantially in the manner as and for the purposes set forth.

6. An underground conduit composed of a series of sections adapted to connect by means of flanges and bolts at the ends of the cable-case sections, with the insulation and wires of each section made to subtend coincidently one of the ends thereof, and at the other end with the insulation flush with the ends of each of the cable-case sections and the wire ends projecting beyond the insulation, a washer or gasket around the subtending end of the insulating material and between the flanges of each section-case, and a branch wire or wires passing out through the flanges and within the gasket, as shown and described.

Signed at Troy, New York, this 28th day of March, 1887, and in the presence of the two witnesses whose names are hereto written.

ROBERT F. SILLIMAN.

Witnesses:
    CHARLES S. BRINTNALL,
    GEO. A. DARBY.